United States Patent
Egeblad et al.

(10) Patent No.: US 10,933,372 B2
(45) Date of Patent: Mar. 2, 2021

(54) METHOD FOR THE REMOVAL OF OXYGEN FROM AN INDUSTRIAL GAS FEED

(71) Applicant: Haldor Topsøe A/S, Kgs. Lyngby (DK)

(72) Inventors: Kresten Egeblad, Farum (DK); Niklas Bengt Jakobsson, Kågeröd (SE); Rasmus Trane-Restrup, Roskilde (DK); Jacob Hjerrild Zeuthen, Birkerød (DK); Troels Dahlgaard Stummann, Copenhagen (DK)

(73) Assignee: Haldor Topsoe A/S, Lyngby (DK)

( * ) Notice: Subject to any disclaimer, the term of this patent is extended or adjusted under 35 U.S.C. 154(b) by 22 days.

(21) Appl. No.: 16/473,436

(22) PCT Filed: Feb. 7, 2018

(86) PCT No.: PCT/EP2018/053028
§ 371 (c)(1),
(2) Date: Jun. 25, 2019

(87) PCT Pub. No.: WO2018/149710
PCT Pub. Date: Aug. 23, 2018

(65) Prior Publication Data
US 2020/0147547 A1    May 14, 2020

(30) Foreign Application Priority Data
Feb. 16, 2017    (DK) .................. 2017 00114

(51) Int. Cl.
*B01D 53/02*    (2006.01)
*B01D 53/34*    (2006.01)
(Continued)

(52) U.S. Cl.
CPC ......... *B01D 53/8671* (2013.01); *B01D 53/02* (2013.01); *B01D 53/343* (2013.01);
(Continued)

(58) Field of Classification Search
CPC ............ B01D 2257/2025; B01D 53/75; B01D 2257/304; B01D 2257/504; B01D 53/343;
(Continued)

(56) References Cited

U.S. PATENT DOCUMENTS

| | | | |
|---|---|---|---|
| 8,211,211 B1 * | 7/2012 | Knaebel ................. | B01D 53/75 95/96 |
| 10,675,585 B2 * | 6/2020 | Jakobsson ............... | C10L 3/101 |

(Continued)

FOREIGN PATENT DOCUMENTS

CN    102433184 A    5/2012
CN    102839028 A    12/2012
(Continued)

OTHER PUBLICATIONS

W. Urban et al., "Catalytically Upgraded Landfill Gas as a Cost-Effective Alternative for Fuel Cells", Journal of Power Sources, vol. 193, No. 1, Dec. 24, 2008, pp. 359-366.

*Primary Examiner* — Timothy C Vanoy
(74) *Attorney, Agent, or Firm* — Blank Rome LLP

(57) ABSTRACT

Oxygen is removed from a gas feed such as a landfill gas, a digester gas or an industrial $CO_2$ off-gas by heating the feed gas, optionally removing siloxanes and silanols from the heated feed gas, optionally removing part of the sulfur-containing compounds in the heated feed gas, injecting one or more reactants for oxygen conversion into the heated feed gas, carrying out a selective catalytic conversion of any or all of the volatile organic compounds (VOCs) present in the gas, including sulfur-containing compounds, chlorine-containing compounds and any of the reactants injected, in at least one suitable reactor, and cleaning the resulting oxygen-depleted gas. The reactants to be injected comprise one or more of $H_2$, CO, ammonia, urea, methanol, ethanol and dimethyl ether (DME).

14 Claims, 1 Drawing Sheet

(51) Int. Cl.
  *B01D 53/50* (2006.01)
  *B01D 53/75* (2006.01)
  *B01D 53/86* (2006.01)

(52) U.S. Cl.
  CPC ......... *B01D 53/501* (2013.01); *B01D 53/507* (2013.01); *B01D 53/508* (2013.01); *B01D 53/75* (2013.01); *B01D 53/8603* (2013.01); *B01D 53/869* (2013.01); *B01D 2251/202* (2013.01); *B01D 2251/204* (2013.01); *B01D 2251/2062* (2013.01); *B01D 2251/2067* (2013.01); *B01D 2251/21* (2013.01); *B01D 2257/104* (2013.01); *B01D 2257/20* (2013.01); *B01D 2257/302* (2013.01); *B01D 2257/304* (2013.01); *B01D 2257/553* (2013.01); *B01D 2257/556* (2013.01); *B01D 2257/708* (2013.01); *B01D 2259/65* (2013.01)

(58) Field of Classification Search
  CPC .. B01D 53/869; B01D 53/02; B01D 53/8603; B01D 2257/55; B01D 2257/306; B01D 2251/208; B01D 2251/2067; B01D 2257/104; B01D 2257/553; B01D 2251/21; B01D 2257/556; B01D 2259/65; B01D 2257/20; B01D 2251/2062; B01D 2257/302; B01D 2251/202; B01D 2257/708; B01D 2251/204; B01D 53/8671; B01D 2258/00; B01D 2258/05; B01D 2258/06
  See application file for complete search history.

(56) References Cited

U.S. PATENT DOCUMENTS

| | | | | |
|---|---|---|---|---|
| 2007/0289448 | A1* | 12/2007 | Silva | B01D 53/265 95/273 |
| 2009/0013870 | A1* | 1/2009 | Sorensen | B01D 53/229 95/96 |
| 2010/0063343 | A1* | 3/2010 | Cusumano | C07C 7/11 585/800 |
| 2011/0094378 | A1* | 4/2011 | Mitariten | B01D 53/229 95/50 |
| 2013/0108531 | A1 | 5/2013 | Mitariten | |
| 2013/0209338 | A1* | 8/2013 | Prasad | C01B 17/16 423/219 |
| 2018/0221817 | A1* | 8/2018 | Prasad | B01D 53/75 |
| 2019/0126201 | A1* | 5/2019 | Jakobsson | B01D 53/78 |
| 2019/0314759 | A1* | 10/2019 | Egeblad | B01D 53/685 |

FOREIGN PATENT DOCUMENTS

| | | | | |
|---|---|---|---|---|
| EP | 0 830 198 B1 | | 3/2002 | |
| EP | 1 997 549 B1 | | 9/2010 | |
| FR | 3 050 122 A1 | * | 10/2017 | ............ B01D 53/52 |
| GB | 2 466 554 A | * | 6/2010 | ............ C01B 3/386 |
| GB | 2466554 A | | 6/2010 | |
| JP | 2011-153245 A | | 8/2011 | |
| WO | WO 96/39243 A1 | | 12/1996 | |
| WO | WO 2004/056449 A2 | | 7/2004 | |
| WO | WO 2008 089147 A2 | * | 7/2008 | ............ C10L 3/10 |
| WO | WO 2012/006729 A1 | | 1/2012 | |

* cited by examiner

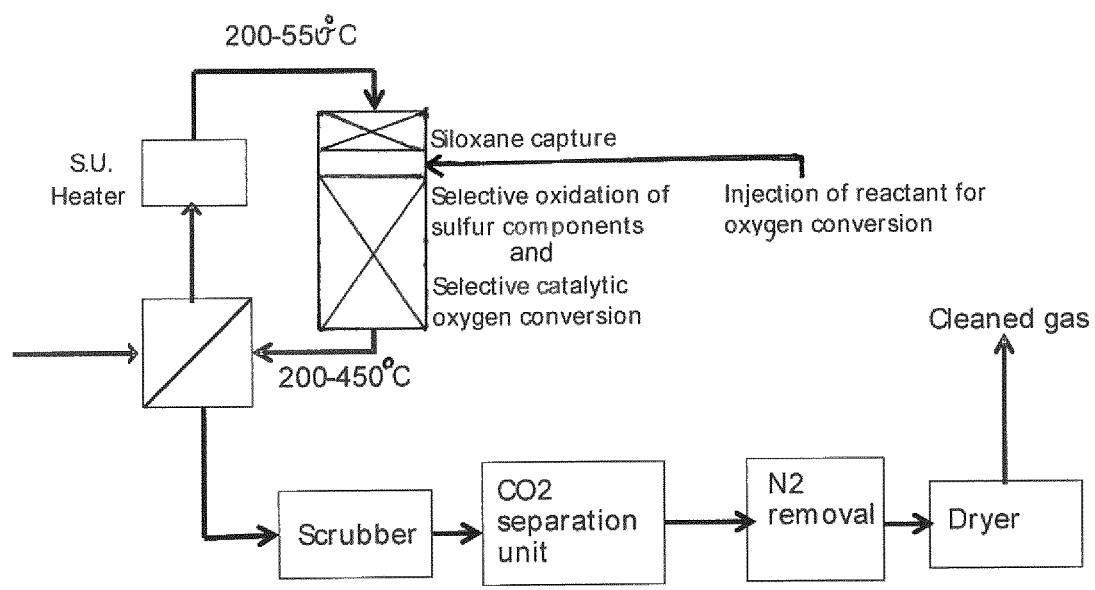

METHOD FOR THE REMOVAL OF OXYGEN FROM AN INDUSTRIAL GAS FEED

BACKGROUND OF THE INVENTION

1. Field of the Invention

The present invention relates to a method for the removal of oxygen from an industrial gas feed through selective catalytic oxidation via reactant injection, where the conversion of sulfur- and chlorine-containing molecules and other volatile organic carbon compounds (VOCs) and the removal of excess oxygen by reaction with methanol both take place in the same reactor.

More specifically, the invention concerns an alternative route to reduce the oxygen content in industrial gases, where the reduction of the content of oxygen is crucial for the valorization of the gas. The method of the invention is especially focused on siloxane/silanol removal and/or sulfur conversion/removal taking place in the hot loop rather than before it.

The method of the invention is focusing on landfill gas (LFG), digester gas and industrial $CO_2$ off-gas. Today, oxygen removal is accomplished through PSA (pressure swing adsorption), membrane or scrubber technologies with very high capital expenditure (CAPEX) and also a substantial loss of valuable components, such as methane in the main gas to the oxygen-containing off-gas. The present invention comprises addition of components, such as $H_2$, CO, methanol, ammonia or ethanol, to the main gas stream and leading the resultant gas stream to at least one catalytic reactor. In said reactor(s), the oxygen is converted selectively to $CO_2$ and water across the catalyst.

2. Description of the Related Art

Removal of oxygen from fuel gas streams is often a requirement for distribution of the gas in the natural gas grid, and it is also a requirement when utilizing the gas as a vehicle transportation fuel. In addition, removal of oxygen is also critical for the utilization of other industrial gas streams, such as in producing merchant or industrial grade $CO_2$ from oxygen-containing off-gases.

U.S. Pat. No. 3,361,531 describes the removal of oxygen from oxygen-containing environments and gas mixtures by absorption in a solid material contact mass. More specifically, a compound selected from copper carbonate, manganese carbonate and iron carbonate is contacted with a hydrogen-containing gas at an elevated temperature below about 500° C., thereby reducing the carbonate to the corresponding oxide compound. This oxide compound is brought into contact with said oxygen-containing environment at around ambient temperature, thereby absorbing the oxygen and oxidizing the oxide compound.

US 2013/0209338 A1 discloses an integrated cleaning system to clean biogas from sources such as landfills and digesters for heat and power generation systems. Siloxanes, chlorine, oxygen and sulfur are removed to ppb levels, and the majority of water and some VOCs is removed as well. The system cools a biogas stream to partially remove contaminants, blends in a small concentration of hydrogen gas and then combusts the remaining oxygen to heat the biogas and leave sufficient hydrogen suitable for a downstream sequence of further contaminant conversion and removal in stages using a hydrodesulfurization bed and adsorbent media beds. This may well be a reasonable approach for low sulfur levels, but not when the $H_2S$ level exceeds 200-300 ppm. The approach according to the present invention is different in that methanol or other reducing agents can be used, and the impurities are kept in oxidized form to be removable from the stream by using a scrubber.

The technologies dominating the industry today are PSA and membrane based technologies in small and medium sized projects (typically up to 10,000 $Nm^3/h$ gas), whereas distillation and cryogenic separation are dominating in larger scale applications.

For applications in the digester gas and landfill gas purification industry the gas flows are in the range of 500 to 10,000 $Nm^3/h$, and technologies based on PSA and membranes are dominating. Apart from an often prohibitive CAPEX, PSA and membrane technologies have a high operation cost because of their complexity and gas compression as well as a substantial loss of valuable hydrocarbons, such as methane, from the feed gas stream to the oxygen containing waste gas stream.

The typical approach when transforming landfill gas to renewable natural gas (RNG) is to carry out the front-end gas conditioning in the following steps:
(1) removal of siloxanes and silanols by absorption,
(2) conversion of sulfur- and chlorine-containing molecules and other volatile organic carbon compounds (VOCs) to $SO_2$, HCl, $CO_2$ and water, using part of the oxygen in the landfill gas as the oxidant,
(3) injection of methanol to the gas and
(4) removal of excess oxygen by reaction with methanol.

Due to excessive heat formation, the above steps (3) and (4) may be carried out in separate steps with inter-bed cooling in between. The composition of the catalyst for steps (2) and (4) is very similar, if not identical. It has been common practice so far to use a design with separate reactors for these steps due to concerns about potential formation of elemental sulfur within the reactor in case the oxygen content becomes too low.

It has however turned out that sulfur formation, or the extent thereof, is not prohibitive to carry out the two steps (2) and (4) in one single reactor instead of using two separate reactors.

SUMMARY OF THE INVENTION

Thus, the present invention relates to a method for the removal of oxygen from an industrial gas feed, said process comprising the steps of:
(a) heating the feed gas,
(b) optionally removing siloxanes and silanols from the heated feed gas,
(c) optionally removing part of the sulfur-containing compounds in the heated feed gas,
(d) injecting one or more reactants for oxygen conversion into the heated feed gas,
(e) carrying out a selective catalytic conversion of any or all of the volatile organic compounds (VOCs) present in the gas, including sulfur-containing compounds, chlorine-containing compounds and any of the reactants injected in step (d), in at least one suitable reactor, and
(f) cleaning the resulting oxygen-depleted gas.

By carrying out the methanol addition to the gas prior to entering the single (i.e. combined) reactor, the catalytic oxidation of sulfur- and chlorine-containing compounds and VOCs (including intentionally added methanol) with the oxygen in the landfill gas to their combustion products ($SO_2$, HCl, $CO_2$ and $H_2O$) is greatly facilitated.

Even though the selective sulfur and chlorine oxidation and the selective catalytic oxygen conversion is done in the same reactor, this reactor may be divided into multiple reactors with proper inter-bed cooling, i.e. heat recovery, in between. This allows for clean-up of gases with higher oxygen contents and for heat integration with amine re-boiler.

BRIEF DESCRIPTION OF THE DRAWING

The sole FIGURE shows the method of the present invention, combined with digester and landfill gas conditioning steps.

DETAILED DESCRIPTION OF THE PREFERRED EMBODIMENTS

In the method according to the present invention, one or more components suitable for catalytic oxidation are injected into the oxygen-containing main gas stream after removal of siloxanes and silanols from the gas. The components and the catalyst are chosen so that the catalyst oxidizes the injected components using the oxygen in the stream without substantially oxidizing the valuable components, such as methane, in the gas stream.

The components to be injected may comprise one or more of i.a. $H_2$, CO, ammonia, urea, ethanol and dimethyl ether (DME).

The active catalyst may comprise a metal selected among vanadium, tungsten, chromium, copper, manganese, molybdenum, platinum, palladium, rhodium and ruthenium in metallic or metal oxide form supported on a carrier selected from alumina, titania, silica and ceria and combinations thereof. Sulfur impurities in an industrial gas can create a corrosive environment inside power generating equipment or even poison catalysts that may be present. In addition, hydrogen sulfide present in the feed gas to gas engines will cause degradation of the lubricating oil and lead to a need of frequent maintenance. Furthermore, $H_2S$ needs to be removed if the gas is to be sent to gas pipelines or used as fuel in vehicles.

Another reason to clean the gas is that other impurities, such as siloxanes, can be deposited within heat and power generation equipment and cause significant damage to the internal components.

Siloxanes are organosilicon compounds comprising silicon, carbon, hydrogen and oxygen which have Si—O—Si bonds. Siloxanes can be linear as well as cyclic. They may be present in biogas because they are used in various beauty products, such as e.g. cosmetics and shampoos that are washed down drains or otherwise disposed of, so that they end up in municipal wastewater and landfills. Siloxanes are not broken down during anaerobic digestion, and as a result, waste gas captured from treatment plants and landfills is often heavily contaminated with these compounds. It is known that siloxanes can be removed using non-regenerative packed bed adsorption with activated carbon or porous silica as sorbent. Regenerative sorbents can also be used as well as units based on gas cooling to very low temperatures to precipitate the siloxanes out from the gas. Further, liquid extraction technologies are used. In addition, these technologies can be used in combination.

A silanol is a functional group in silicon chemistry with the connectivity Si—O—H. It is related to the hydroxy functional group C—O—H found in all alcohols.

So a major issue in the utilization of raw gas from landfills and anaerobic digesters is to provide a gas stream with a low sulfur content, i.e. less than a few hundred ppm, and with a very low content of siloxanes, typically linear or cyclic dimethyl Si—O—Si compounds, and silanols. Pipeline specifications for natural gas are even stricter. In this case, $H_2S$ must be removed to a residual concentration below 5 ppm, and $CO_2$ and $N_2$ need to be removed as well. Combustion of sulfur containing compounds leads to formation of sulfur trioxide which will react with moisture in the gas to form sulfuric acid, which can condense in cold spots and lead to corrosion. However, particularly siloxanes give rise to problems because they are converted to $SiO_2$ during combustion, leading to build-up of abrasive solid deposits inside the engine and causing damage, reduced service time and increased maintenance requirements for many components such as compressors, fans, blowers, burner nozzles, heat recovery surfaces in boilers and for gas engine components such as spark plugs, valves, pistons etc. In addition to causing damage and reduced service time to the engine, also any catalysts installed to control exhaust gas emissions are sensitive to $SiO_2$ entrained in the gas stream, in fact even more so than the engine itself. For an SCR (selective catalytic reduction) catalyst, for example, the $SiO_2$ tolerance can be as low as 250 ppb.

For the reasons outlined above it is very desirable to remove siloxanes, silanols and sulfur-containing compounds from gas streams.

Preferably the gas feed, from which oxygen is to be removed, is a landfill gas, a digester gas or an industrial $CO_2$ off-gas.

In a preferred embodiment of the method of the invention, a gas stream, such as a landfill gas containing $H_2S$ and organic sulfur along with siloxanes, $CO_2$, $H_2O$, methane, chlorinated compounds, freon compounds and various VOC (volatile organic carbon) compounds, is treated.

The components to be injected in step (d) comprise one or more of $H_2$, CO, ammonia, urea, methanol, ethanol and dimethylether (DME).

Landfill gas of low quality, i.e. having a high content of nitrogen and oxygen, is more difficult and expensive to upgrade to pipeline quality than gases with a lower content of nitrogen and oxygen. Using the reactant injection to remove the oxygen from low quality landfill gases will lead to a high temperature increase in the reactor, which in turn will damage the catalyst. If, however, the reactant is dosed at two different points instead of one point, it is possible to use two reactors in series with cooling and reactant injection in between. This approach has the added benefit that the energy recovered after each reactor can be used in a reboiler in the $CO_2$ separation unit (amine wash) to regenerate the amine, and it can also be used as a feed preheater. The energy for the reboiler and for preheating of the feed would otherwise have to come from electricity or from combustion of landfill gas or natural gas.

The heat coming from the oxidation can be transferred to an oil circuit which is used both to run a reboiler in the amine wash in the subsequent $CO_2$ removal and to preheat the feed.

The invention is illustrated further with reference to the FIGURE, where the present invention is combined with Applicant's GECCO™ technology for digester and landfill gas conditioning. The feed gas is heated to 200-450° C. and fed to a siloxane and silanol absorption bed comprising alumina, alumina with nickel, silica or combinations thereof. After siloxane and silanol removal, one or more components suitable for catalytic oxidation, i.e. $H_2$, CO, ammonia, urea, methanol, ethanol, DME etc., is/are injected into the main gas stream containing oxygen. Then the gas is fed to a catalytic reactor for both selective oxidation of sulfur components and selective catalytic oxygen conversion. Said catalytic reactor contains one or more catalysts converting the sulfur compounds to $SO_2$ and the VOC compounds (not methane and light [i.e. C3 and lower] hydrocarbons) to $CO_2$ and water and also hydrogen halides if some of the VOCs are halogenated. The catalyst(s) also effect(s) selective oxidation to $H_2O$ and $CO_2$, while the valuable hydrocarbons, such as methane and light [i.e. C3 and lower] hydrocarbons, are substantially not converted. It is preferred that the catalyst comprises tungsten, vanadium, molybdenum, platinum or palladium in metallic or metal oxide form supported on a $TiO_2$ carrier.

The catalyst(s) can be selected from tungsten, vanadium, molybdenum, platinum and palladium in metallic or in metal oxide form supported on a $TiO_2$ carrier or from vanadium, tungsten, chromium, copper, manganese, molybdenum, platinum, palladium, rhodium or ruthenium in metallic or metal oxide form supported on a carrier selected from alumina, titania, silica and ceria or combinations thereof.

The hot reactor exit gas can be utilized to heat the reactor inlet gas by using a feed-effluent heat exchanger.

The additional heat generated in the oxygen removal step will provide a higher temperature difference for the feed-effluent heat exchanger, which reduces the CAPEX.

Downstream from the heat exchanger, the $SO_2$ is removed in a wet caustic or $H_2O_2$ scrubber or a dry scrubber using a caustic sorbent. After the $SO_2$ removal, $CO_2$ is removed by using amine-based technology, solvent-based $CO_2$ removal technology, water-based $CO_2$ removal technology or alternatively PSA and/or membrane technology.

Nitrogen removal can be accomplished using membrane or PSA based technology. Then water is removed by using cooling and condensation followed by a molecular sieve, alternatively in a TSA configuration. Alternatively, the nitrogen removal unit is positioned downstream from the water removal unit.

It is further preferred that the catalyst is monolithic to decrease the power consumption for transport of the landfill gas through the cleaning section.

The invention claimed is:

1. A method for the removal of oxygen from an industrial gas feed, said method comprising the following steps:
    (a) heating the feed gas,
    (b) optionally removing siloxanes and silanols from the heated feed gas,
    (c) optionally removing part of the sulfur-containing compounds in the heated feed gas,
    (d) injecting one or more reactants for oxygen conversion into the heated feed gas,
    (e) carrying out a selective catalytic conversion of any or all of the volatile organic compounds (VOCs) present in the gas, including sulfur-containing compounds, chlorine-containing compounds and any of the reactants injected in step (d), in at least one reactor, and
    (f) cleaning the resulting oxygen-depleted gas.

2. Method according to claim 1, wherein the reactor in step (e) is divided into two or more reactors with inter-bed cooling in between.

3. Method according to claim 1, wherein the gas feed, from which oxygen is to be removed, is a landfill gas, a digester gas or an industrial $CO_2$ off-gas.

4. Method according to claim 1, wherein the cleaning in step (f) comprises removal of $CO_2$ in a separation unit, removal of $N_2$ and drying of the cleaned gas.

5. Method according to claim 1, wherein the gas comprises nitrogen and oxygen.

6. Method according to claim 2, wherein the energy recovered after each reactor is used in a re-boiler in the $CO_2$ separation unit.

7. Method according to claim 1, wherein the feed gas is heated to a temperature of between 150 and 450° C.

8. Method according to claim 1, wherein the feed gas is heated to a temperature of between 150 and 450° C. and thereafter fed to the units for sulfur, siloxane and silanol removal.

9. Method according to claim 8, wherein the feed gas to the sulfur, siloxane and silanol removal units is heated through heat exchange with the effluent gas from the oxygen removal step.

10. Method according to claim 1, wherein the components to be injected comprise one or more of $H_2$, CO, ammonia, urea, methanol, ethanol and dimethyl-ether (DME).

11. Method according to claim 3, wherein the landfill gas contains $H_2S$ and organic sulfur along with siloxanes, silanols, $CO_2$, $H_2O$, methane, chlorinated compounds, freon compounds and various VOC (volatile organic carbon) compounds.

12. Method according to claim 1, wherein the catalyst comprises a metal selected among vanadium, tungsten, chromium, copper, manganese, molybdenum, platinum, palladium, rhodium and ruthenium in metallic or metal oxide form supported on a carrier selected from alumina, titania, silica and ceria.

13. Method according to claim 1, wherein the sulfur components are converted to $SO_2$ through selective catalytic conversion and the $SO_2$ is removed in a scrubber.

14. Method according to claim 13, wherein the $SO_2$ is removed in a wet caustic or $H_2O_2$ scrubber or in a dry scrubber using a caustic sorbent.

* * * * *